United States Patent [19]

Saito et al.

[11] 4,170,155
[45] Oct. 9, 1979

[54] ROTARY CUTTER FOR SUCCESSIVELY CUTTING MOVING MATERIAL TO LENGTHS

[75] Inventors: Minoru Saito, Odawara; Yutaka Matsumoto, Oicho, both of Japan

[73] Assignee: Nihon Electronic Industry Co., Ltd., Odawara, Japan

[21] Appl. No.: 848,359

[22] Filed: Nov. 3, 1977

[51] Int. Cl.² .................... G05B 19/28; B26D 5/20
[52] U.S. Cl. ................................... 83/76; 318/601
[58] Field of Search .......................... 83/76; 318/601

[56] References Cited

U.S. PATENT DOCUMENTS

| 3,668,957 | 6/1972 | Nido ................................ 83/76 X |
| 4,015,183 | 3/1977 | Miyakita et al. ............... 183/76 X |
| 4,020,406 | 4/1977 | Tokuno et al. ................... 83/76 X |

FOREIGN PATENT DOCUMENTS 2120160 8/1972 France.

Primary Examiner—J. M. Meister

Attorney, Agent, or Firm—Fleit & Jacobson

[57] ABSTRACT

A system for controlling the speed of a DC motor so that the material fed to a rotary cutter is successively cut to desired lengths. The speed of the rotary cutter driving DC motor is controlled in accordance with a rotary cutter speed control pattern which is determined by the relation between the length of the rotary cutter circumference and the length to which the material is to be cut. This rotary cutter speed control pattern is provided in the form of speed command signals in accordance with a function output derived by setting the length of the rotary cutter circumference, the length to which the material is to be cut and the cutting distance during which the rotary cutter speed and the material travel speed synchronize with each other. The system also accomplishes the necessary control for correcting any error caused between the speed control pattern and the actual rotary cutter speed as well as the required acceleration control of the motor in accordance with the speed control pattern.

8 Claims, 7 Drawing Figures

ROTARY CUTTER FOR SUCCESSIVELY CUTTING MOVING MATERIAL TO LENGTHS

BACKGROUND OF THE INVENTION

The present invention relates to rotary cutters for successively cutting a continuous moving material, such as, paper, sheeting or tube, and more particularly the invention relates to a system for controlling the speed of a rotary cutter driving DC motor in accordance with a rotary cutter speed control pattern which is dependent on the relation between the desired material-cutting length and the length of the rotary cutter circumference.

The rotary cutters of the above type now in use most widely are divided into those which are controlled mechanically and others which are controlled electronically. In the case of the mechanically controlled rotary cutter, the rotary cutter is connected to the power source of a material feeding mechanism through a speed change gear and a crank chain so that the rotary cutter and the material feed mechanism are driven from the same power source. In other words, a change in the material-cutting length is effected by changing the change gear ratio.

Also during the periods of cutting operation, the cutter speed and the material travel speed must be made equal to each other, and consequently the material travel speed is made equal to the cutter speed by the nonuniform motion of the crank chain.

A disadvantage of this type of mechanically controlled rotary cutter is that since the speed changing operation can be effected only gradually, when effecting a change in the material-cutting length, the material is lost during the time that the length is being changed, that during the periods of acceleration and deceleration of the material travel speed, the material-cutting length is changed by the difference in mechanical deflection between the feed mechanism and the rotary cutter, and that a cutting error is caused by the slip between the feed mechanism and the material.

On the other hand, while a large part of the deficiencies of the mechanical type have been overcome by the electronically controlled rotary cutter, the electronically controlled rotary cutter has the following disadvantages.

The conventional electronically controlled rotary cutters are based on the method in which material travel detection pulses are subtractively applied to a register and also a number of pulses corresponding to the material-cutting length are also applied additively to the register each time the cutter moves past the cutting end point. At the same time, a number of pulses corresponding to one rotation of the rotary cutter are subtractively applied to the register, and the content of the register is converted into a DC voltage of the opposite sign which in turn is applied in proportion to the material travel speed to the DC voltage constituting the forward running speed command for the cutter. Consequently, only when the resulting sum has the polarity which rotates the cutter in the forward direction, the sum is applied as a speed reference to a speed controller of the cutter driving DC motor.

With this method, since the pulses corresponding to the material-cutting length and those corresponding to one rotation of the cutter are applied upon completion of cutting, excepting where the number of pulses corresponding to one rotation of the cutter is close to that corresponding to the material-cutting length, the rotary cutter is subjected, irrespective of the material travel speed, to rapid acceleration or deceleration which is dependent on the current limitation of the servomotor and consequently the maximum torque is always exerted on the mechanical parts.

This tends to considerably deteriorate the durability of the mechanical parts.

Also, since a large power is handled in the electronically controlled rotary cutter, the cutter is usually controlled by a DC motor and a thyristor Ward-Leonard control system. However, it is the usual practice to increase the response speed at the sacrifice of the loop gain due to the necessity to control the high speeds with the limited frequencies, and consequently the above-mentioned control system is not able to provide the necessary operating speeds as well as the acceleration and deceleration speeds, thus making it impossible to compensate for the decrease in the gain by a digital circuit. This results in deteriorated accuracy of the servomotor. On the other hand, since the content of the register is converted into a DC voltage of the opposite sign and combined with the material travel speed voltage so that the resulting sum is applied as an input to the rotary cutter driving servomotor only when its value is of the polarity which rotates the cutter in the forward direction, if the sum is within the range which does not cause the cutter to rotate in the forward direction, a zero input is applied as the servo input irrespective of the content of the register.

Thus, if, in these conditions, a zero point drift occurs in the servomotor, despite the fact that the cutter must be at rest, the cutter is slowly rotated in one or the other direction.

In the case of long lengths, this has the effect of reducing the effective follow-up time and thereby deteriorating the accuracy.

Further with this system, taking one example where there is no need to take into consideration the frictional torque of the rotary cutter and where the material-cutting length is greater than the length of the cutter circumference, the DC voltage derived by converting the register content is so set that when the register content corresponds to the length of the cutter circumference, the DC voltage obtained by converting it becomes equal to the maximum travel speed voltage of the material which is permitted by the maximum acceleration/deceleration of the rotary cutter.

This means that the feedback quantity of error cannot be set to obtain the optimum results, thus resulting in deteriorated accuracy. With this system, the follow-up speed of the servomotor also decreases exponentially with decrease in the register content, namely, when the register content decreases to one half, the follow-up speed of the servomotor also decreases to one half, and the follow-up speed decreases to one fourth when the register content decreases to one fourth, and so on. Thus, as compared with the systems in which the servomotor is caused to follow up linearly until the error is decreased sufficiently, far great follow-up time is required. Even if the follow-up is not sufficient, the error in the previous cutting is retained in the register so that the material can be cut to the desired length during the next cutting operation. However, the rentention of such steady-state error tends to cause the error to be changed by a change in the speed as well as a change in the material-cutting length, thus causing the actual error.

SUMMARY OF THE INVENTION

Therefore, the present invention has been made to overcome the foregoing deficiencies of the prior art rotary cutters, and it is an object of the present invention to provide a system for controlling the speed of a rotary cutter driving DC motor in accordance with a rotary cutter speed control pattern derived from the relation between the material-cutting length and the length of the rotary cutter circumference, thereby successively cutting the material to lengths with a high degree of accuracy.

It is another object of the invention to provide such system in which three control signals, i.e., speed command signal, follow-up error signal and acceleration signal are computed for controlling the speed of a rotary cutter driving DC motor in accordance with a rotary cutter speed control pattern and the travel speed of a material.

It is still another object of the invention to provide a coefficient generator whereby an acceleration/deceleration coefficient indicative of speed variation in the rotary cutter speed control pattern is derived from the material-cutting length and the length of the rotary cutter circumference.

It is still another object of the invention to provide a function generator for generating a function output indicative of the desired rotary cutter speed control pattern in accordance with the applied acceleration/deceleration coefficient and material travel speed detection pulses.

The above and other objects, features and advantages of this invention will become apparent from the following description taken in conjunction with the accompanying drawings.

DETAILED DESCRIPTION OF THE PREFERRED EMBODIMENTS

Figure 1:
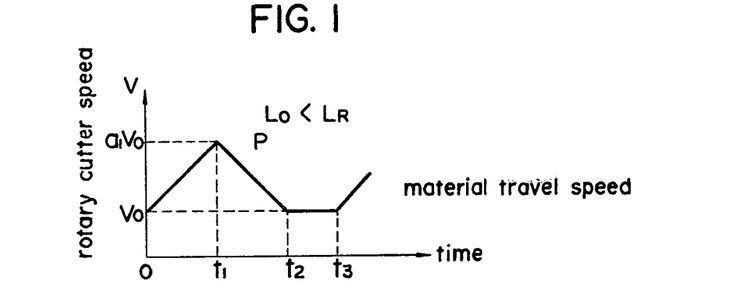
FIG. 1 is a graph showing the rotary cutter speed control pattern used with the invention when the material-cutting length is shorter than the length of the rotary cutter circumference.
Figure 2:
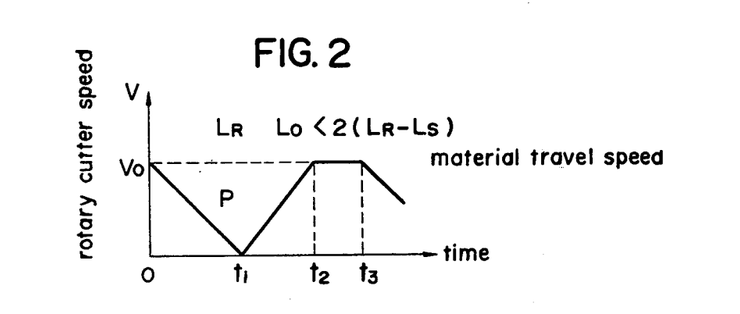
FIG. 2 is a graph showing the rotary cutter speed control pattern used with the invention when the material-cutting length is longer than the length of the rotary cutter circumference.
Figure 3:
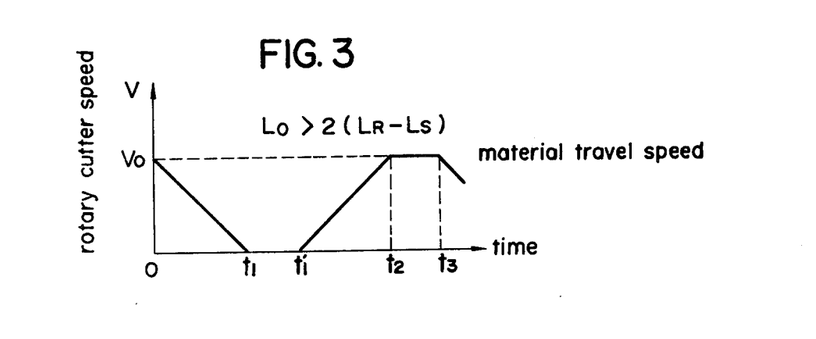
FIG. 3 is a graph showing the rotary cutter speed control pattern used with the invention when the material-cutting length is longer than two times the length obtained by substracting the cutting distance of the cutter from the length of the rotary cutter circumference.

The rotary cutter speed control patterns used with the invention can be represented by three different types of speed control pattern in accordance with the relation between the cutting length $L_O$ of a material and the circumferential length $L_R$ of one rotation of the rotary cutter edge as shown in FIGS. 1 to 3.

Referring to FIG. 1 in which the ordinate represents the rotary cutter speed V and the abscissa represents the time t, there is illustrated the speed control pattern obtained when the material-cutting length $L_O$ is shorter than the cutter circumferential length $L_R$ or $L_O < L_R$ with the material travel speed being at $V_o$. In other words, upon completion of each cutting, the rotary cutter must take up the length of the difference $\Delta L$ between the circumferential length $L_R$ and the material-cutting length $L_O$, and consequently the rotary cutter is accelerated to rotate faster up to a time $t_1$ at which it attains a speed $a_1 V_o$ and then the cutter is decelerated up to a time $t_2$ at which it attains the speed $V_o$ which is equal to the mateiral travel speed, thus completing the cutting operation at t time $t_3$.

FIG. 2 shows the speed control pattern used when the material-cutting length $L_O$ is greater than the circumferential length $L_R$, namely, when the material is cut to longer lengths. In this case, the speed of the rotary cutter is decelerated by an amount corresponding to $\Delta L = L_R - L_O$ to feed the material and then the cutter speed is returned to the material travel speed, thus initiating the cutting operation and completing it at the time $t_3$.

FIG. 3 shows the speed control pattern used in cases where the material is cut to still longer lengths $L_O > 2(L_R - L_S)$, namely, the material-cutting length $L_O$ is greater than two times the difference between the cutter circumferential length $L_R$ and the cutter cutting distance $L_S$. Here, the cutter cutting distance $L_S$ is defined as the distance travelled by the material during the time interval $t_2 \sim t_3$ during which the material travel speed is synchronized with the rotary cutter speed. Thus, after the completion of each cutting, the cutter is decelerated so that it makes about a half turn and comes to a stop at the time $t_1$, and after the expiration of a predetermined time at rest the cutter is restarted so that it attains the material travel speed $V_o$ at the time $t_2$ thus initiating the next cutting operation.

Figure 4:
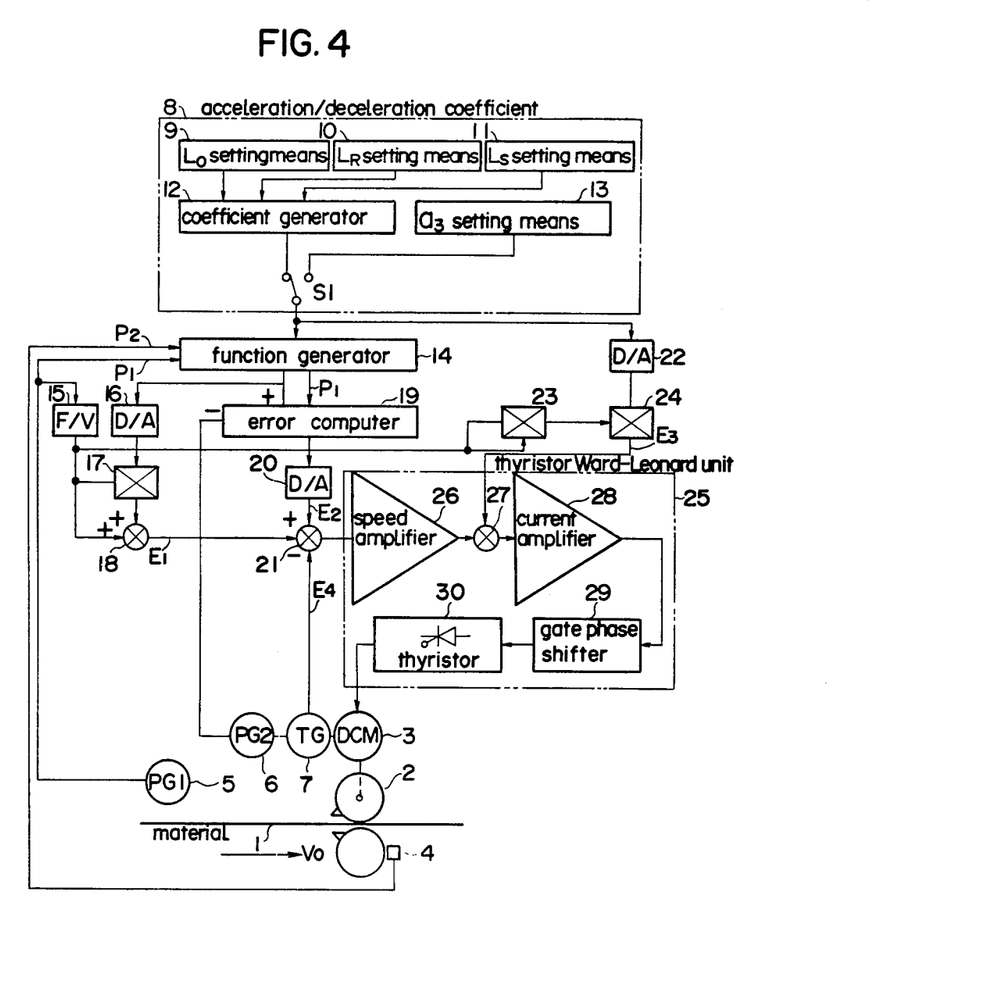
FIG. 4 is a circuit block diagram showing a preferred embodiment of the invention.

FIG. 4 is a block diagram showing an embodiment of the invention. In the Figure, numeral 1 designates a material to be cut to lengths, 2 a rotary cutter, 3 a rotary cutter driving DC motor, 4 a limit switch for detecting the completion of cutting operation of the rotary cutter 2, 5 a material travel pulse generator (PG1), 6 a pulse generator (PG2) for detecting the amount of rotation of the rotary cutter 2, 7 a tachometer generator (TG) for detecting the rotational speed of the rotary cutter 2.

In the computing unit for providing the speed patterns shown in FIGS. 1 to 3, numeral 8 designates an acceleration/deceleration coefficient generating circuit, 14 a function generator, 15 a frequency-to-voltage converter, 16, 20 and 22 digital-to-analog converters (D/A), 17, 23 and 24 multipliers, 19 an error computing unit, 18 and 21 summing points. In a thyristor Ward-Leonard unit 25 for controlling the DC motor 3, numeral 26 designates a speed controller, 27 a summing point, 28 a current controller, 29 a gate phase shifter, 30 a thyristor.

The acceleration/deceleration coefficient generating circuit 8 will now be described first. The acceleration/deceleration coefficient generating circuit 8 performs the necessary digital computation to provide the desired acceleration/deceleration coefficient $a_3$.

The computational procedures for obtaining the acceleration/deceleration coefficient $a_3$ will now be described. In the computational procedures described hereunder, the following symbols represent as follows.

$V_o$ = material travel speed
$V$ = cutter rotational speed
$L_R$ = cutter circumferential length
$L_S$ = cutter cutting distance
$L_f$ = distance travelled by material during period of corrective operation in which cutter is subjected to acceleration/deceleration control (correction travel distance)
$t_1$ = time of turning point in speed patterns of FIGS. 1 to 3.
$t_2$ = time at which cutter speed becomes equal to material travel speed
$t_3$ = time of one cutting cycle
$K$ = straight line slope of speed pattern
$a_1, a_2$ = constants
$a_3$ = acceleration/deceleration coefficient
$l_R$ = cutter rotational distance
$l_O$ = material travel distance Referring to FIG. 1, assuming that the cutter speed V attains the speed $a_1V_o$ during the period $0 \sim t_1$, the resulting straight line slope K is given by $$K = a_1 V_o / t_1 \qquad (1)$$

In this case, the cutter speed $V_o \sim t_1$ is given by $$V_{o \sim t_1} = V_o + Kt = V_o + (a_1 V_o / t_1)t \qquad (2)$$

On the other hand, the correction travel distance $L_f$ is given by $L_f = V_o t_2 = V_o \cdot 2t_1$, and substituting this in the equation (2), we obtain $$V_{o \sim t_1} = V_o + (2a_1 V_o^2 / L_f)t \qquad (3)$$

Assuming here that $a_1/L_f = a_2$, then we obtain $$V_{o \sim t} = V_o + 2a_2 V_o^2 t \qquad (4)$$

In the like manner, the cutter speed $V_{t_1 \sim t_2}$ during the time period $t_1 \sim t_2$ is given by $$V_{t_1 \sim t_2} = V_o + 2a_2 V_o^2 t_1 - 2a_2 V_o^2 (t - t_1) \qquad (5)$$

Also, the cutter speed $V_{t_2 \sim t_3}$ during the time period $t_2 \sim t_3$ is given by $$V_{t_2 \sim t_3} = V_o \qquad (6)$$

In this way, the necessary equation for computing the desired speed pattern is obtained.

Thus, since the cutter rotational distance $L_R$ is given as the sum of the time integrals of the cutter speeds $V_{o \sim t_1}, V_{t_1 \sim t_2}$ and $V_{t_2 \sim t_3}$, we obtain $$L_R = \int_0^{t_1} V_{o \sim t_1} dt + \int_{t_1}^{t_2} V_{t_1 \sim t_2} dt + \int_{t_2}^{t_3} V_{t_2 \sim t_3} dt \qquad (9)$$
$$= V_o t_3 + 4a_2 V_o^2 t_1 t_2 - a_2 V_o^2 t_2^2$$

Since $2t_1 = t_2$, we obtain $$L_R = V_o t_3 + a_2 V_o^2 t_2^2 \qquad (10)$$

Further, since $V_o t_2 = L_f$ (correction travel distance) and $V_o t_3 = L_O$ (material-cutting length), we obtain $$L_R = L_O + a_2 L_f^2 \qquad (11)$$

Here it is assumed that $a_2 = a_3/2$. This is a constant given to simplify as $2a_2 = a_3$ in the equations (4) and (5). Consequently, the equation (11) is written as $$L_R + L_O + a_3 L_f^2 / 2$$

Thus, $a_3$ is given by $$a_3 = 2(L_R - L_O)/L_f^2$$

Since $L_f = L_O - L_S$, it is finally given by $$a_3 = 2(L_R - L_O)/(L_O - L_S)^2 \qquad (12)$$

As will be seen from the above equation (12), the acceleration/deceleration coefficient can be computed by giving the cutter circumferential length $L_R$, the material-cutting length $L_O$ and the cutting distance $L_S$.

By substituting $a_2 = a_3/2$ in the above equations (4) and (5), the speed pattern of FIG. 1 is given by $$\begin{cases} V_{o \sim t_1} = V_o + a_3 V_o^2 t & (13) \\ V_{t_1 \sim t_2} = V_o + a_3 V_o^2 t_1 - a_3 V_o^2 (t - t_1) & (14) \\ V_{t_2 \sim t_3} = V_o & (15) \end{cases}$$

Thus, the rotational speed of the rotary cutter can be given as a function of the acceleration/deceleration coefficient $a_3$, material travel speed $V_o$, turning point time $t_1$ and time t.

As regards the meaning of the acceleration/deceleration coefficient $a_3$, it represents the rotational speed displacement which the rotary cutter 2 must make for every pulse from the material travel pulse generator 5 of FIG. 4. As a result, by adding or subtracting the acceleration/deceleration coefficient $a_3$ for every material travel pulse, the speed pattern for the straight line slope segments (during $t_1 \sim t_2$ and $t_2 \sim t_3$) in FIGS. 1 to 3 can be functionally output.

To execute the computation of the acceleration/deceleration coefficient given by the equation (12), the acceleration/deceleration coefficient generating circuit 8 shown in FIG. 4 includes setting means 9, 10 and 11 for respectively setting the material-cutting length $L_O$, cutter circumferential length $L_R$ and cutting distance $L_S$, so that the setting means apply the values of $L_O$, $L_R$ and $L_S$ in the form of digital binary codes to a coefficient generator 12, and the coefficient generator 12 generates an acceleration/deceleration coefficient $a_3$ by the computation of the equation (12). Setting means 13 has preset therein, as a constant, the required acceleration/deceleration coefficient $a_3$ for cutting the material to the longer lengths shown in FIG. 3, and these coefficient outputs are selectively delivered by a switch $S_1$.

Next, the function generator 14 shown in FIG. 4 will be described.

The function generator 14 performs the following three operations in response to the acceleration/deceleration coefficient $a_3$ applied from the acceleration/deceleration coefficient generating circuit 8, the material travel pulses $P_1$ applied from the material travel pulse generator 5 and the reset pulse $P_2$ applied from the limit switch 4 for detecting the end of each cutting operation:

(a) The computation of the time of turning point of the speed pattern (time $t_1$).

(b) The computation of the rotational speed displacement which must be made by the rotary cutter for every travel pulse $P_1$ (during $0 \sim t_1$ and $t_1 \sim t_2$).

(c) The stopping of the function output (the time $t_2$).

Figure 5:
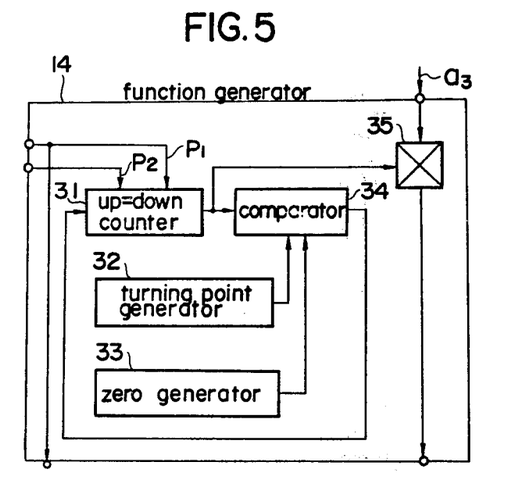
FIG. 5 is a circuit block diagram showing the function generator used in the embodiment of FIG. 4.
Figure 6:
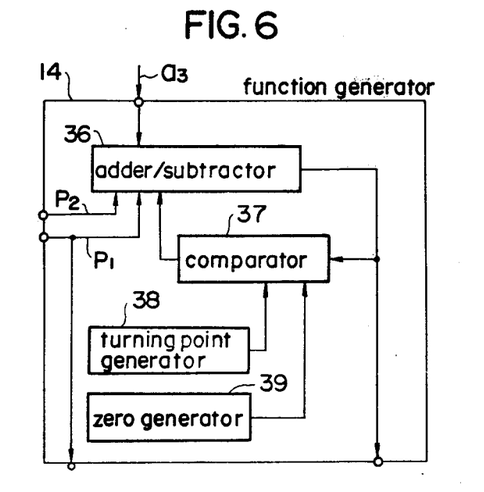
FIG. 6 is a circuit block diagram showing another form of the function generator used in the embodiment of FIG. 4.

Embodiments of the function generator 14 are shown in FIGS. 5 and 6.

In FIG. 5, the circuit construction of the function generator 14 comprises an up-down counter 31, a turning point generator 32, a zero point generator 33, a comparator 34 and a multiplier 35.

The operation for providing the function output corresponding to the speed pattern shown in FIG. 1 is as follows. Upon completion of each cutting, a reset pulse $P_2$ is applied to the up-down counter 31 so that the up-down counter 31 is reset to its initial state and the next cutting cycle is started. The up-down counter 31 counts up the travel pulses $P_1$ up to the time $t_1$ and the resulting count N is successively applied to the multiplier 35 which in turn multiplies together the applied count N and the acceleration/deceleration coefficient $a_3$ to generate a function output indicative of the speed displacement which must be made by the rotary cutter in response to the movement of the material. This count N is also applied to the comparator 34 which in turn compares it with the count indicative of the turning point or $[(L_O - L_S)/2]$, so that when the count N attains the value of $[(L_O - L_S)/2]$, a discrimination output is generated to switch the up-down counter 31 to perform subtraction or countdown operation. In response to the comparison value from the zero point generator 33, the comparator 34 discriminates that the content of the up-down counter 31 is decreased to zero, so that when the counter content is reduced to zero, the operation of the up-down counter 31 is stopped and the generation of the function is terminated.

FIG. 6 shows another embodiment of the function generator 14.

While, in the function generator shown in FIG. 5, the count N of travel pulses $P_1$ is obtained and multiplied by the acceleration/deceleration coefficient $a_3$, this is equivalent to addition or subtraction of the acceleration/deceleration coefficient $a_3$ in response to every travel pulse $p_1$. Thus, in accordance with the embodiment shown in FIG. 6, the circuit construction of the function generator comprises an adding and subtracting unit 36, a comparator 37, a turning point generator 38 and a zero point generator 39, whereby the adding and subtracting unit 36 adds or subtracts the acceleration/deceleration coefficient $a_3$ in response to every travel pulse $p_1$. In other words, the addition is performed up to the turning point after which the subtraction is performed, and the computation is completed when the output of the adding and subtracting unit 36 is reduced to zero. In this case, the reference discrimination output of the turning point generator 38 is given by $[(L_R - L_O)a_3/2]$.

In the case of the speed pattern of FIG. 2 for cutting the material to the longer lengths, there is a relation $L_R < L_O$ so that the acceleration/deceleration coefficient given by the equation (12) assumes a negative value and a function is generated in a manner reverse to that used in the case of FIG. 1. Thus, in response to the resetting by the reset pulse $P_2$ indicative of the completion of the cutting cycle, a deceleration function is computed and the computation of an acceleration function is started at the turning point. The generation of the function is stopped when the rotary cutter speed becomes equal to the material travel speed.

In the case of the speed pattern of FIG. 3 for cutting the material to still longer lengths such as given by $[L_O > 2(L_R - L_S)]$, the desired cutting operation cannot be accomplished by the generation of such function. As a result, the desired accleration/deceleration coefficient $a_3$ is computed from the equation (12) on the basis of $[L_O = 2(L_R - L_S)]$ and the resulting value is preset in the coefficient setting means 13 of the coefficient generating circuit 8 shown in FIG. 4, whereby the switch $S_1$ is operated to apply this value to the function generator 14. Where this coefficient $a_3$ is used, the function output is reduced to zero at the point of $[(L_R - L_S)/2]$ or the time $t_1$ is reached, and consequently the generation of function is stopped to stop the operation of the cutter during the time corresponding to a material travel distance $[L_O - 2(L_R - L_S)]$ which cannot be absorbed by the acceleration/deceleration coefficient $a_3$. After the lapse of the time corresponding to $[L_O - 2(L_R - L_S)]$ or at a time $t_1'$, the generation of the function output is resumed in accordance with the coefficient $a_3$. This stopping operation may be accomplished by inhibiting the function generator from operating in response to the applied travel pulses $P_1$ or by preventing the application of travel pulses $P_1$ to the function generator until the time that the travel distance $[L_O - 2(L_R - L_S)]$ has been absorbed. In other words, by establishing the desired function generator stopping interval after the point $[(L_O - L_S)/2]$ in accordance with $[L_O - 2(L_R - L_S)]$, it is possible to generate the desired function for cutting the material to the desired lengths having the relation $[L_O > 2(L_R - L_S)]$.

Figure 7:
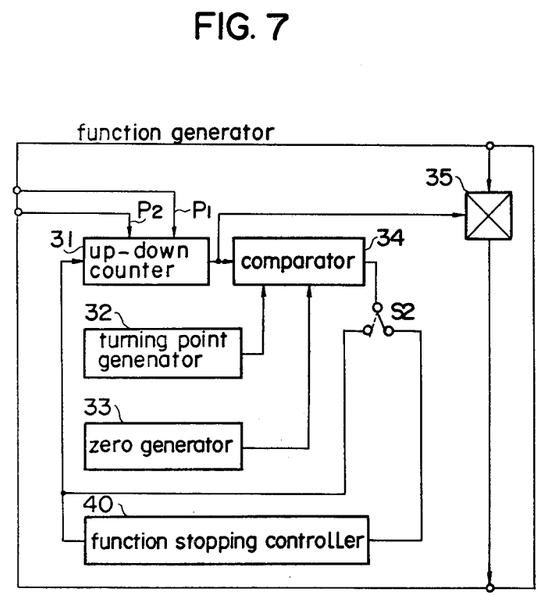
FIG. 7 is a circuit block diagram showing still another form of the function generator used in embodiment of FIG. 4.

FIG. 7 shows still another embodiment of the function generator which further comprises a function stopping controller 40, whereby when the function output is reduced to zero at the time $t_1$ in FIG. 3, the counting operation of the up-down counter 31 is stopped during the time that the material travels the distance $[L_O - 2(L_R - L_S)]$. The function stopping controller 40 is connected to the comparator 34 through switch means $S_2$ which is operatively associated with the switch means $S_1$ provided in the coefficient generator 8 of FIG. 4. As a result, when the switch $S_2$ is moved to the position shown in the Figure, the function output corresponding to the speed pattern of FIG. 3 is generated.

Referring again to FIG. 4, the function output of the function generator 14 is applied to the D/A converter 16 whose output is applied to the multiplier 17 in which it is multiplied by the material travel speed $V_o$ applied from the frequency/voltage converter 15, and the resulting multiplication output is combined with the material travel speed at the summing point 18, thus generating a cutter speed signal $E_1$ for the rotary cutter 2.

Again the cutter speed is given from the equations (4), (5) and (6) in accordance with the acceleration/deceleration coefficient $a_3$, as follows:

$$\begin{cases} V_{o \sim t_1} = V_o + a_3 V_o^2 t & (13) \\ V_{t_1 \sim t_2} = V_o + a_3 V_o^2 t_1 - a_3 V_o^2 (t - t_1) & (14) \\ V_{t_2 \sim t_3} = V_o & (15) \end{cases}$$

Limiting the description of the operation to the time interval $o \sim t_1$ in FIG. 1 for purposes of simplicity, since the second term $V_o t$ in the right member of the equation (13) is equal to the material travel distance $l_o$, it is given by $$V_{o \sim t} = V_o + a_3 l_o V_o \qquad (16)$$

The second term $a_3 l_o$ in the right member of the equation (16) corresponds to the function output of the function generator 14. In other words, the function output $a_3l_o$ is the result obtained by adding the acceleration/deceleration coefficient $a_3$ for every travel pulse $P_1$. Since each of the travel pulses $P_1$ from the material travel pulse generator 5 corresponds to 1 mm or 0.1 mm travelled by the material, the material travel distance $l_o$ may be rewritten in terms of the count N of travel pulses $P_1$, and consequently the value obtained by subjecting the function output $a_3N$ of the function generator 14 to D/A conversion in the D/A converter 16 represents the value of $a_3l_o$.

This $a_3l_o$ is applied to the multiplier 17 in which it is multiplied by the material travel speed $V_o$ obtained by converting the frequency of travel pulses $P_1$ to the corresponding voltage, and the resulting value $a_3l_oV_o$ is combined with the material travel speed $V_o$ at the summing point 18, thus producing the cutter speed signal $E_1$ for the time interval $o \sim t_1$ which is given by the equation (16). This cutter speed signal $E_1$ is applied, as a speed setting value, to the speed controller 26 of the thyristor Ward-Leonard unit 25 through the summing point 21, thus controlling the DC motor 3 to accelerate it.

It will thus be seen that it is only necessary to perform the computation in response to the material travel detecting pulses $P_1$, although the computation is subject to variations in accordance with the distance travelled by the material.

In the like manner, the cutter speed signal $E_1$ given by the equation (14) is computed for the time interval $t_1 \sim t_2$, and the output of the function generator 14 is stopped during the time interval $t_2 \sim t_3$. Consequently, the output of the multiplier 17 is reduced to zero and only the material travel speed $V_o$ is delivered through the summing point 18 as the cutter speed signal $E_1$.

In the case of the speed patterns shown in FIGS. 2 and 3, the desired cutter speed signal $E_1$ is computed in accordance with the function output of the function generator 14.

Next, the follow-up error signal $E_2$ applied to the summing point 21 will be described.

The computation of follow-up error is effected in the error computing unit 19 in response to the function output of the function generator 14 and the pulse output $P_3$ of the pulse generator 6 which detects the rotational position information of the rotary cutter 2.

Here, the relation between the material travel distance $\Delta l_o$ (instantaneous value) and the cutter travel distance $\Delta l_R$ derived by differentiating with $\Delta t$ the equation (16) representing the cutter speed $V_{o \sim t1}$ during the time interval $o \sim t_1$, is given as follows $$V_{o \sim t1} = \Delta l_R/\Delta t = \Delta l_o/\Delta t + a_3l_o \cdot \Delta l_o/\Delta t$$

$$\Delta l_R = \Delta l_o + a_3l_o \cdot \Delta l_o \quad (17)$$

Thus, the cutter travel distance $\Delta l_R$ can be obtained in terms of the material travel pulses $P_1$ indicative of $\Delta l_o$ and consequently the cutter rotational distance $l_R$ corresponding to the material travel distance $l_o$ can be obtained by integrating the travel distance $\Delta l_R$.

To obtain the cutter rotational distance $l_R$ corresponding to the material travel distance, the error computing unit 19 obtains the cutter rotational distance $l_R$ in terms of a rotational position by an integration operation in which the function output $a_3l_o$ applied from the function generator 14 for each material travel pulse $P_1$ is combined with the material travel pulse $P_1$, and then the resulting sum is added for every material travel pulse $P_1$.

The error computing unit 19 also receives the pulse signals $P_3$ from the pulse generator 6 adapted to measure the actual amount of rotation of the cutter 2. Consequently, the error computing unit 19 subtracts the actually measured cutter rotational distance from the cutter rotational distance $l_R$ obtained in terms of an integrated value to finally generate a rotary cutter follow-up error.

The follow-up error generated from the error computing unit 19 is converted into a voltage signal $E_2$ by the D/A converter 20 and it is then fed back to the summing point 21, thus effecting an error follow-up control which always reduces the content of the error computing unit 19 to zero. By virtue of this error follow-up control, the cutter follows up the integrated value porduced in the error computing unit 19, thus accomplishing the desired cutting of the material with a high degree of accuracy.

Also fed back to the summing point 21 is a rotational speed signal $E_4$ detected by the tachometer generator 7 and corresponding to the cutter speed signal $E_1$ applied from the summing point 18.

Next, the computation of the acceleration signal $E_3$ applied to the summing point 27 of the thyristor Ward-Leonard unit 25 will be described. The purpose of this computation of the acceleration signal $E_3$ is to generate a voltage signal corresponding to a current which applies the required driving torque to the DC motor 3 to accelerate or decelerate the rotational speed of the cutter.

By differentiating the cutter rotational speed $V_{o \sim t1}$ given by the equation (16), the acceleration rate during the time interval $o \sim t_1$ is given by $$dV_{o \sim t1}/dt = a_3V_o^2 \quad (17)$$

In other words, the acceleration rate is the one obtained by multiplying the acceleration/deceleration coefficient $a_3$ by the square of the material travel speed $V_o$. This computation of acceleration is effected by the D/A converter 22 and the multipliers 23 and 24. In other words, the acceleration signal $E_3$ of $a_3V_o^2$ is obtained by subjecting the acceleration/deceleration coefficient $a_3$ to D/A conversion in the D/A converter 22, squaring in the multiplier 23 the material travel speed applied from the F/V converter 15 and then multiplying the D/A converted value $a_3$ by the squared value $V_o^2$ in the multiplier 24.

The acceleration signal $E_3$ becomes $-a_3V_o^2$ during the time interval $t_1 \sim t_2$, and it is reduced to zero during the time interval $t_2 \sim t_3$.

It will thus be seen from the foregoing description that by virtue of the fact that a function output corresponding to the detection of material travel pulses is generated in accordance with an acceleration/deceleration coefficient for providing a predetermined cutter rotational speed pattern which is dependent on the relation between a material-cutting length $L_o$ and an inherent cutter circumferential length $L_R$, and the computation of three control functions, i.e., a desired rotary cutter speed, follow-up error and acceleration are computed according to the function output, the rotary cutter according to the present invention is capable of accomplishing the desired continuous automatic cutting of a material to desired lengths with a high degree of accuracy and also overcoming the deficiencies of the prior art rotary cutter.

We claim:

1. In a rotary cutter adapted for successively cutting a material to lengths in accordance with a rotary cutter rotational speed control pattern which is determined by the relation between a cutting length of said material and the circumferential length of said cutter, the combination comprising:

coefficient generating means for computing an acceleration/deceleration coefficient indicative of variation of the rotational speed of said rotary cutter for every material travel speed detecting pulse in accordance with a preliminarily set material-cutting length, rotary cutter circumferential length and cutter cutting distance;

function generating means for generating a rotary cutter speed control function in response to material travel speed detection pulses which are counted up or counted down in accordance with the acceleration/deceleration coefficient computed by said coefficient generating means and said rotary cutter rotational speed control pattern;

speed computing means for multiplying together the speed control function generated by said function generator and a material travel speed obtained by converting said material travel speed detection pulses to obtain a product and then adding said material travel speed to said product to generate a rotary cutter operating speed command signal;

error computing means for adding the sum of the speed control function generated by said function generator and said material travel speed detection pulse in response to the application of each said material travel speed detection pulse to compute the amount of rotation of said cutter and for subtracting an actually detected amount of rotation of said cutter form said computed amount of cutter rotation to generate a cutter follow-up error signal;

acceleration computing means for multiplying together the acceleration/deceleration coefficient computed by said coefficient generating means and a square of said material travel speed to generate an acceleration signal to control the amount of current which generates a DC motor driving torque necessary to accelerate or decelerate said cutter; and cutter speed controlling means including a speed amplifier and a current amplifier, said cutter speed controlling means being responsive to said operation speed command signal, said follow-up error signal and said acceleration signal for controlling a cutter driving DC motor, wherein said follow-up error signal is fed to said speed amplifier and said acceleration signal is fed to said current amplifier.

2. A rotary cutter according to claim 1, wherein said coefficient generating means comprises a plurality of setting means for respectively setting said rotary cutter circumferential length, said material-cutting length and said cutter cutting distance, and a coefficient generator responsive to the set values of said setting means to compute said acceleration/deceleration coefficient according to the following equation:

$$a_3 = \frac{2(L_R - L_O)}{(L_O - L_S)^2}$$

where
$a_3$ = acceleration/deceleration coefficient
$L_R$ = rotary cutter circumferential length
$L_O$ = material-cutting length
$L_S$ = cutter cutting distance.

3. A rotary cutter according to claim 2, wherein said coefficient generating means further comprises another setting means for setting a preliminarily computed acceleration/deceleration coefficient, and switching means for selectively supplying the outputs of said plurality of setting means and said another setting means.

4. A rotary cutter according to claim 1, wherein said function generating means comprises:

an up-down counter for counting up or counting down said material travel speed detecting pulses to generate a count output;

a turning point generator for setting a transition point at which said up-down counter is switched from the forward counting operation to the backward counting operation;

a zero point generator for setting a stop point for said up-down counter;

a comparator for comparing the forward count output of said up-down counter with the set value of said turning point generator to switch said up-down counter from the forward counting operation to the backward counting operation when the equality is found between said count value and said set value, and for comparing the backward count value of said up-down counter with the set value of said zero point generator to stop said up-down counter when the equality is found therebetween; and a multiplier for multiplying together the count value of said up-down counter and the acceleration/deceleration coefficient from said coefficient generating means to compute said speed control function.

5. A rotary cutter according to claim 4, wherein said turning point generator sets said transition point in terms of $(L_O - L_S)/2$.

6. A rotary cutter according to claim 1, wherein said function generating means comprises:

an adder/subtractor for adding or subtracting the acceleration/deceleration coefficient applied from said coefficient generating means for every material travel speed detection pulse to generate said speed control function;

a turning point generator for setting a transition point at which said adder/subtractor with the set value of said turning point generator to switch said adder/subtractor from the adding operation to the subtraction operation when the equality is found between said addition output and said set value, and for comparing the subtraction output of said adder/subtractor with the set value of said zero point generator to stop said adder/subtractor when the equality is found therebetween.

7. A rotary cutter according to claim 6, wherein said turning point generator sets said transition point in terms of $(L_O - L_S)a_3/2$.

8. A rotary cutter according to claim 4, wherein said function generating means further comprises circuit means, whereby when the acceleration/deceleration coefficient from said coefficient generator is applied as a set value, said circuit means responds to the turning point discrimination output of said comparator to stop said up-down counter for a period of time which allows said material to travel a length of $L_O - 2(L_R - L_S)$.

* * * * *